No. 713,181. Patented Nov. 11, 1902.
J. WACK.
MINE TRAP DOOR.
(Application filed Jan. 2, 1902.)
(No Model.) 6 Sheets—Sheet 1.

WITNESSES:
INVENTOR
John Wack
Chas. P. Miller
ATT'Y.

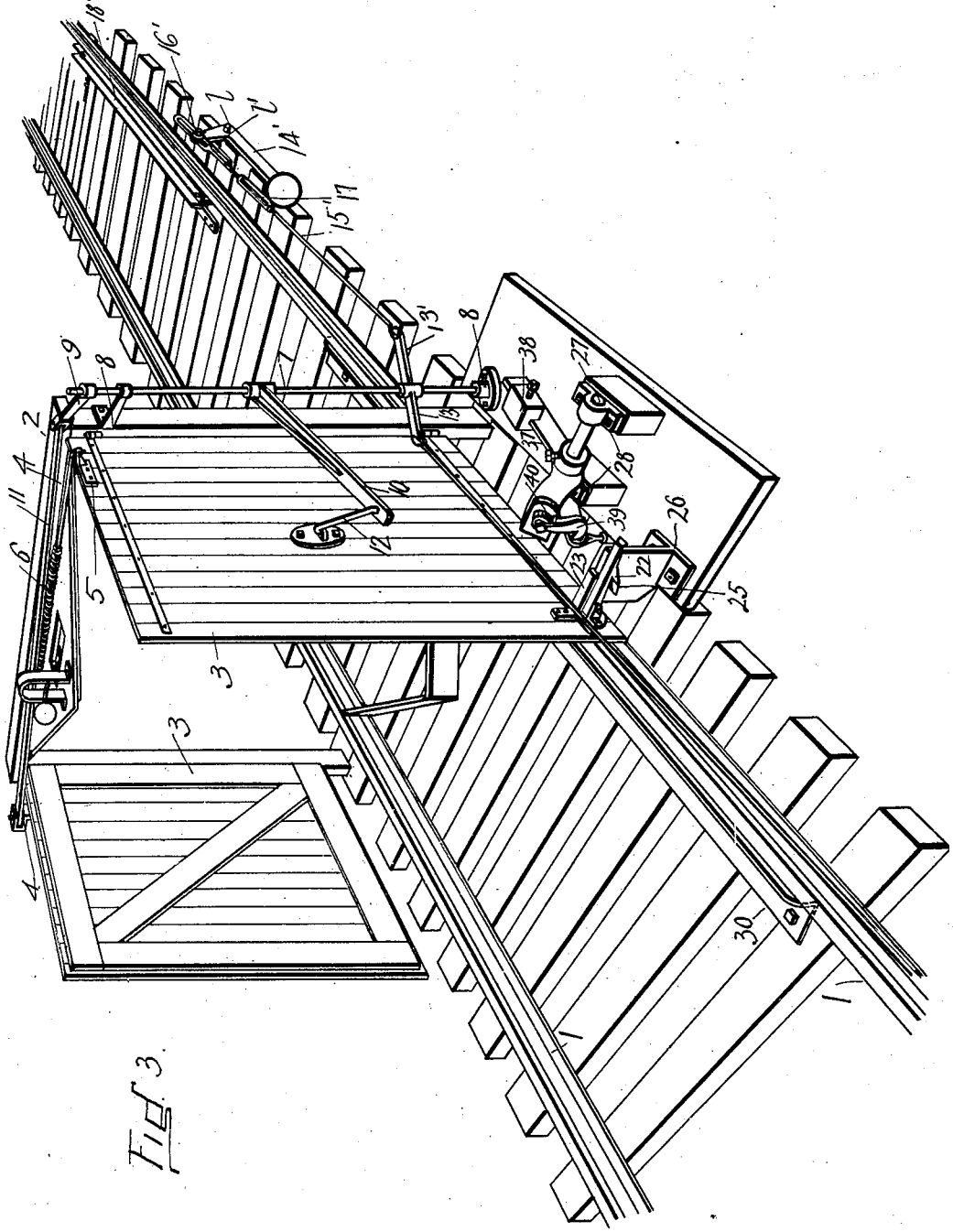

No. 713,181. Patented Nov. 11, 1902.
J. WACK.
MINE TRAP DOOR.
(Application filed Jan. 2, 1902.)
(No Model.) 6 Sheets—Sheet 4.
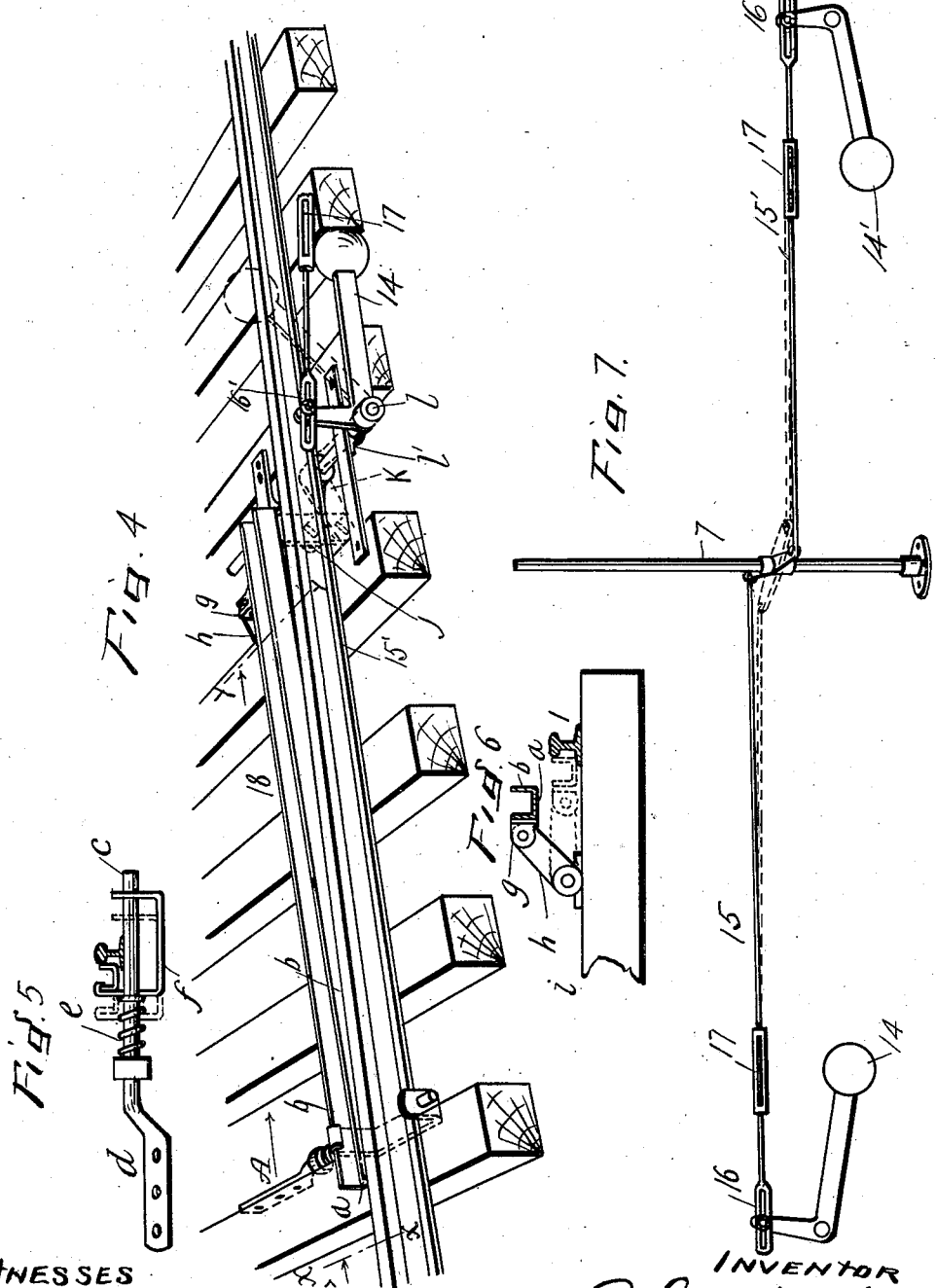

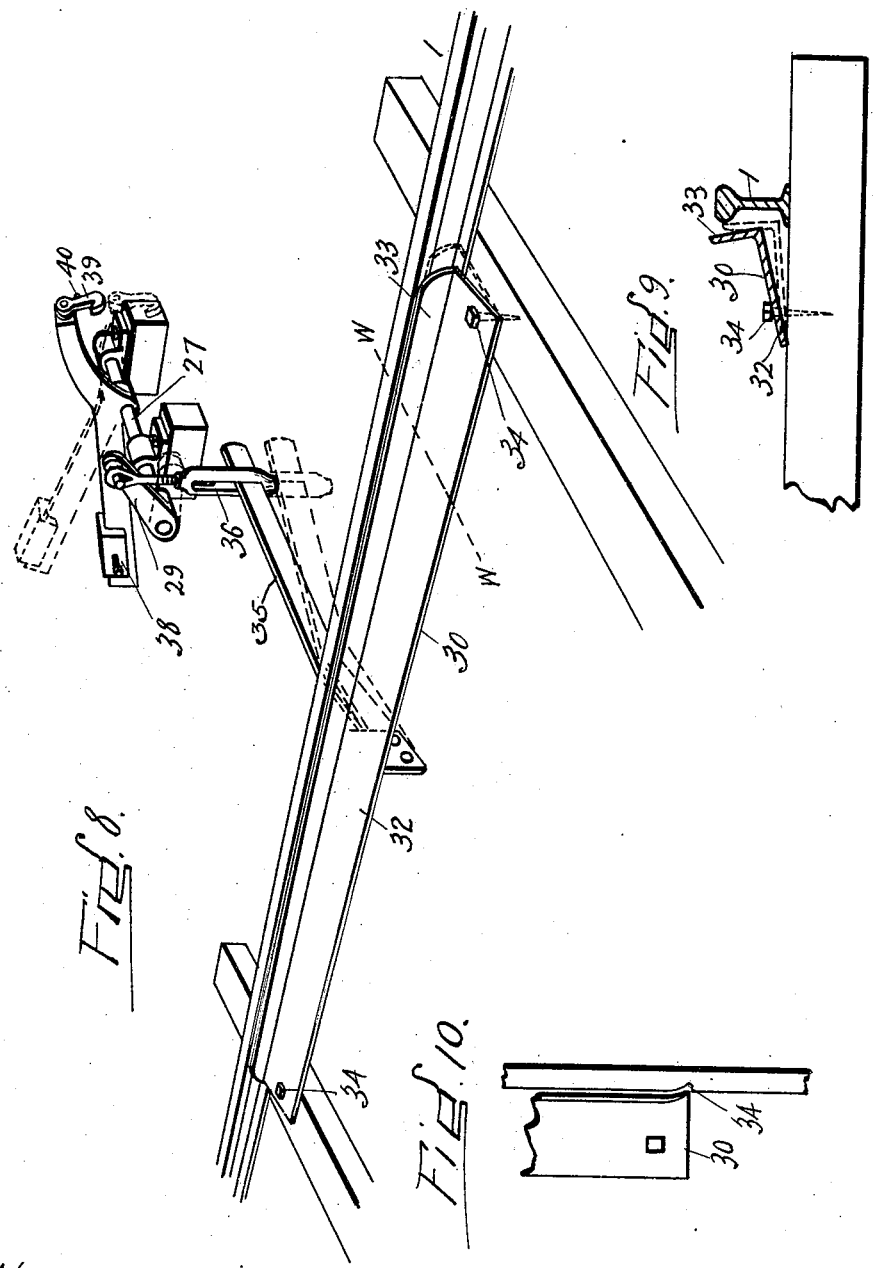

No. 713,181. Patented Nov. 11, 1902.
J. WACK.
MINE TRAP DOOR.
(Application filed Jan. 2, 1902.)
(No Model.) 6 Sheets—Sheet 6.
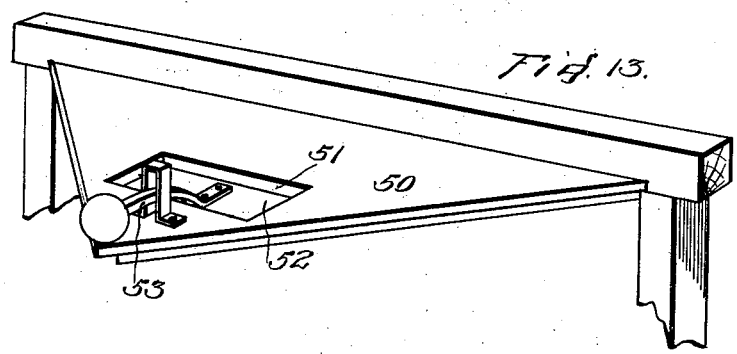
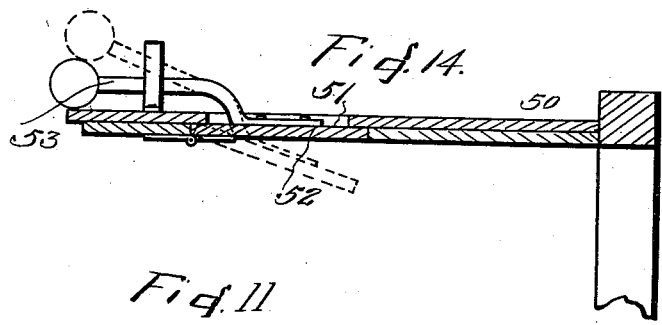
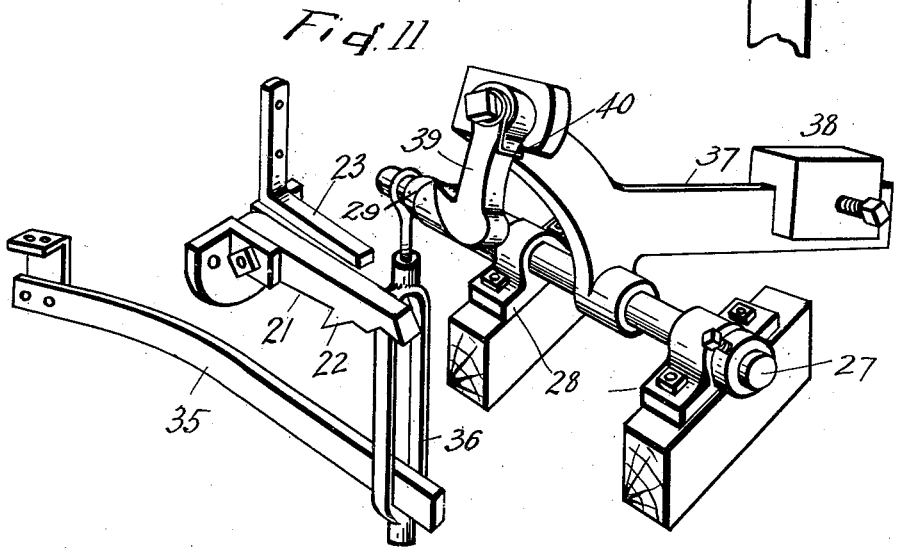
WITNESSES:
INVENTOR
John Wack
By Chas. R. Miller
ATTY

UNITED STATES PATENT OFFICE.

JOHN WACK, OF CANTON, OHIO.

MINE TRAP-DOOR.

SPECIFICATION forming part of Letters Patent No. 713,181, dated November 11, 1902.

Application filed January 2, 1902. Serial No. 88,149. (No model.)

*To all whom it may concern:*

Be it known that I, JOHN WACK, a citizen of the United States, residing at Canton, in the county of Stark and State of Ohio, have invented new and useful Improvements in Mine Trap-Doors, of which the following is a specification.

The invention relates to mine trap-doors, and more particularly to mechanism for operating the same.

The object of the invention is to provide simple, durable, reliable, and comparatively inexpensive mechanism for opening the doors upon the approach of a mine-car, holding them open while the car is passing through the doorway, and then releasing them and permitting them to close.

With these and other objects in view the invention consists of certain novel features of construction, combination, and arrangement of parts, which will be hereinafter more fully described, and particularly pointed out in the appended claims.

Figure 1:
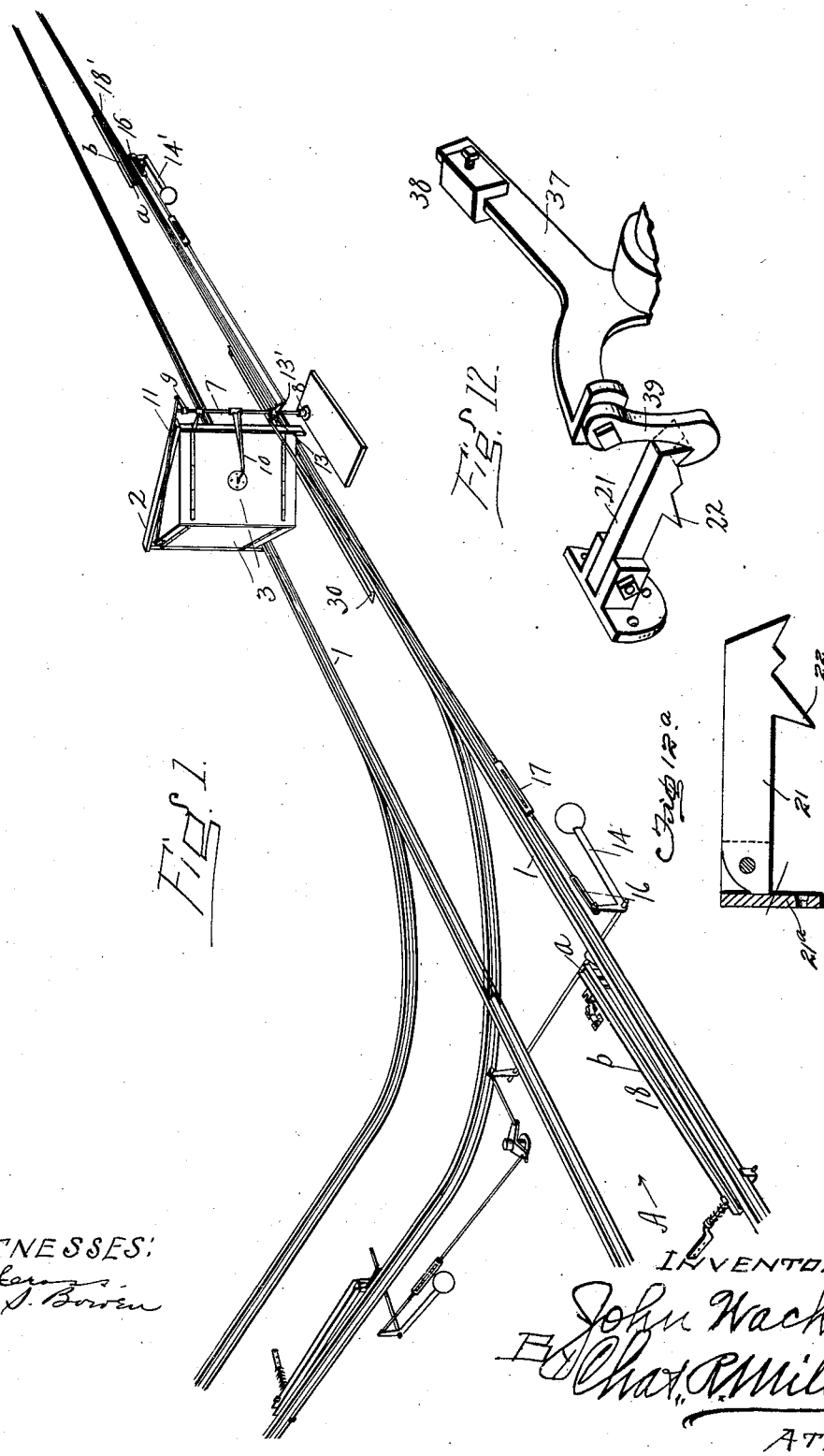
Figure 2:
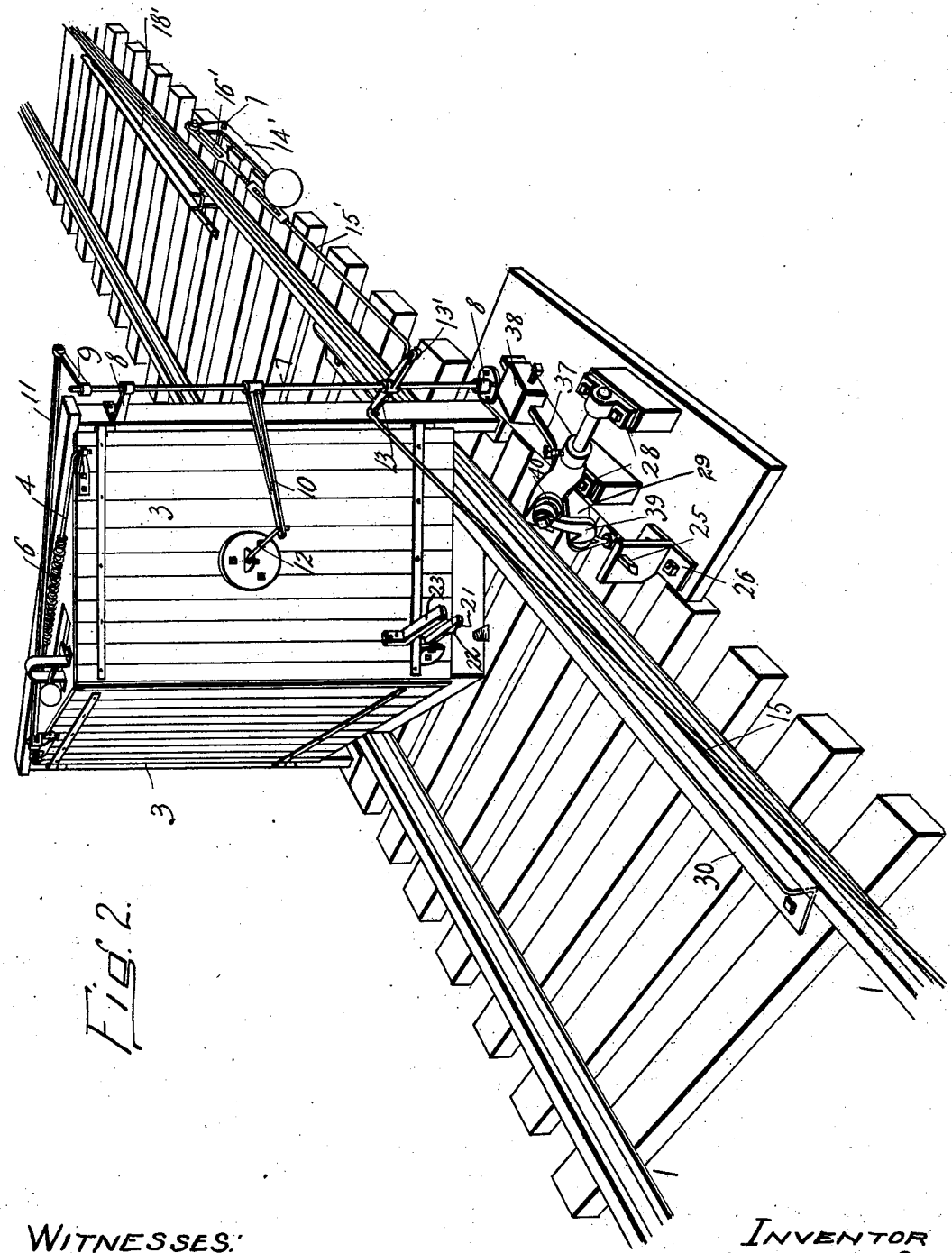

In the accompanying drawings, Figure 1 is a perspective view illustrating in a general way, but without details, the arrangement of the invention. Fig. 2 is a perspective view showing the mine-doors closed. Fig. 3 is a similar view showing the mine-doors open. Fig. 4 is an enlarged detail perspective view of a portion of a track, illustrating the movable actuating-bar. Fig. 5 is a vertical cross-sectional view through line $x\ x$ of Fig. 4. Fig. 6 is a similar view through line $y\ y$ of Fig. 4. Fig. 7 is a detail view of the door-operating shaft, the weighted levers, and the links connecting the weighted levers to said shaft. Fig. 8 is an enlarged detail perspective view of a section of a track, its movable actuating-bar, and the mechanism controlled thereby for releasing the doors. Fig. 9 is a vertical sectional view on line $w\ w$ of Fig. 8. Fig. 10 is a detail top plan view of the movable actuating-bar and rail, showing the vertical flange of the bar slightly beveled or flared, so as to offer no obstruction to the passage of the flange of the wheel into engagement with the horizontal portion of the bar, the tread of the rail on its inner side being provided with a slight recess to permit of the flange of the bar moving upwardly. Fig. 11 is a detail perspective view of the means for locking the doors in their open position. Fig. 12 is a similar view of several of the parts shown in Fig. 11, but arranged in a different position. Fig. 12$^a$ is a detail view showing the manner of mounting the latch 21, the bracket 21$^a$ appearing in section. Fig. 13 is a perspective view of the upper end of the door-frame, showing the safety-valve; and Fig. 14 is a vertical sectional view through the same parts.

Referring to the drawings, 1 denotes the track-rails; 2, the door-frame; 3, the doors hinged to the vertical posts thereof and adapted to close across the track and when so closed to be at angles to each other, as shown in Fig. 2.

4 denotes links pivoted to brackets 5, secured to the doors and connected together at their inner ends by a stiff coiled spring 6, the energy of which is exerted to close the doors.

7 denotes a vertical shaft journaled in suitable bearings 8 and provided with door-operating cranks 9 and 10, the former of which is connected to the farthermost door by a pivoted link 11, while the latter is connected to the other door by a pivoted link 12. 13 and 13' denote cranks secured to said shaft.

14 and 14' denote weighted crank-levers fixed to the shafts $l$, journaled in brackets $l'$ along the sides of the track and connected to the cranks 13 and 13' by links 15 and 15', which have a slip-joint connection at 16 and 16' for a purpose hereinafter to appear, and each of which consists of two parts connected together by turnbuckles 17, provided for compensating for expansion and contraction and wear at the joints.

18 and 18' denote the actuating-bars for opening the doors, arranged along the track close to one of the rails thereof at some distance on opposite sides of the doors, the ends of the bars farthest from the doors being closer to the track than the opposite ends, as shown in Figs. 1, 2, and 4. Each of these bars preferably consists of a channel-iron having a horizontal base $a$ and vertical sides $b$. The end of each bar nearest the rail is supported to slide laterally upon a finger $c$ of a bracket $d$, secured to the side of one of the ties and is held in close contact with the rail by a coiled spring $e$. This sliding connection of the bar with respect to the finger c is preferably effected by a yoke f, which is perforated to receive the finger c and is firmly secured to one of the vertical webs of the bar. The opposite end of the bar on its inner side is provided with a lug g, which is pivoted by a link h to a bracket i, secured to one of the ties. This link is so arranged that upon depression of that end the bar will be moved toward the rail. Each bar has also projecting down from this end a lug j, which is pivoted to a crank k, which in turn is fixed to the shaft l, to which one of the crank-levers 14 14' is fixed.

Assuming the car to be approaching in the direction of the arrow A (shown in Figs. 1 and 4) and the doors to be closed, the flange of the car-wheel will roll upon the web portion a of the bar 18, and as it rolls along said bar will depress the opposite end toward the rail, which movement rocks the shaft l, raises the crank-lever 14 without disturbing the weighted crank-lever 14', owing to its slip-joint connection with the link 15', rotates the shaft 7, and thus swings the doors wide open into the position shown in Fig. 3, in which position they are held by means to be hereinafter described. A car moving in the opposite direction to the arrow A after passing through the doors will have the flanges of its wheels on that side of the track where the bar is located pass between the separated sides of the bar and rail, and as the car continues on its journey the flanges of its wheels will press out that end of the bar which is close to the rail without depressing said bar, the spring e yielding to permit of this lateral movement of the bar, and after the car has passed said spring exerts its energy to force that end of the bar into close contact with or relation to the rail.

I shall now proceed to describe the means for holding the doors open after having been opened by the mechanism just described.

One of the doors is provided with a latch 21, having an inclined or beveled outer face 22. This latch is free to swing upwardly from its normal horizontal position, and when the doors are swung open the bill of said latch is adapted to ride over a catch-stud 25, projecting laterally from a bracket 26, and, striking an angle-bar 23, is knocked downward into locked engagement with said stud, and thus in holding the door open to which the latch is attached holds the other door open, owing to the connection of both doors to the shaft 7, as one door cannot close or open without closing or opening the other door. As shown in Fig. 12ª, the latch 21 is pivoted to a bracket 21ª and has a 'square face to bear against the body portion of said bracket, whereby the latch is prevented from tilting down below a horizontal position, the upper rear edge of the latch being suitably curved, however, to permit it to swing vertically above the horizontal to engage the catch-stud 25.

I will now proceed to describe the means for releasing said doors to permit them to close.

27 denotes a shaft journaled in suitable bearings 28 and provided at one end with a crank-arm 29.

30 denotes an actuating-bar arranged alongside of one of the rails and extending through the doorway. This actuating-bar consists of a horizontal base 32 and a vertical flange 33, the latter being arranged in close proximity to the tread of the track and in normal position held slightly above the same. This bar has a rocking or tilting movement, as shown in dotted lines in Figs. 8 and 9, and is preferably held in place by spikes or bolts 34. The ends of this bar, or, strictly speaking, the ends of the vertical flange 33, are preferably flared outward and engage notches 34', formed in the tread of the rail. By this flaring of the flange 33 no obstruction is presented, the flange of the wheel being more readily engaged with the horizontal portion 32 of the bar and depressing the same to the position shown in dotted lines in Figs. 8 and 9. The bar is provided with a laterally-projecting arm 35, which is connected by a yoke 36 to the crank 29 of the shaft 27. Thus when said bar 31 is depressed said shaft 27 will be rocked in its bearings.

37 denotes a crank fixed to the shaft 27 and provided at one end with an adjustable weight 38 and at its opposite end with a releasing-latch 39, acted upon by a spring 40 to force the bill of the latch toward the free end of the latch 21. The doors have been described as being opened by the depression of the bar 18 and as having been locked in this open position by the engagement of the latch 21 with the catch-stud 25. Now as the car passes on its way to the door-opening the bar 31 will be depressed. The depression of this bar will rock the shaft 27 and swing its pivoted latch into engagement with the outer end of the latch 21, and while the car is on the bar 31 and is passing through the doorway the shaft 27 will be held in its rocked position, with its latch 39 in engagement with the latch 21; but the instant the wheels of the car pass from engagement with the bar 31 the weight 38 will rock the shaft 27 in the opposite direction and elevate the latch 39, which in turn will elevate the latch 21 from engagement with the catch-stud 25, and thus permit the spring 6 to close the door.

When a car moves in the direction indicated by the arrow B, the parts operate in the same manner as hereinbefore described, and a further description of the operation of the device is thought to be unnecessary.

Should an explosion take place in the mine at a point to the right of the door, (shown in Figs. 1, 2, and 3,) the pressure of gases will force the doors open; but should an explosion take place in the mine at a point on the opposite side of said doors said doors, owing to their peculiar arrangement, would not open. To offset this objection, I provide means which consist of a triangular plate 50, secured to the top cross-piece of the door-frame and formed with a gas-escape opening 51, closed by a hinged downwardly-opening valve 52, held normally closed by the weighted arm 53. It will thus be seen that when the gas-pressure within the mine exceeds the weight of the weighted arm 53 the valve will open and permit the escape of gas downwardly through said opening.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination with a mine trap-door; of an actuating-bar operatively connected to said door to open the same, said bar having one end arranged closer to a track-rail than its other end, spring-controlled means permitting that end of the bar which is closer to the rail to move laterally relative to the rail, and means operatively mounting the opposite end of the bar to move laterally and downwardly toward the rail when the bar is depressed, substantially as specified.

2. The combination with a mine trap-door; of an actuating-bar operatively connected to said door to open the same, said bar having one end arranged closer to a track-rail than its opposite end, a guide-bracket, a yoke sliding on said bracket and fixed to that end of the bar which is closer to the rail, thereby adapting said end of the bar to move laterally relative to the rail, a spring acting on the yoke to move the bar toward the rail, and means operatively mounting the opposite end of the bar to move laterally and downwardly toward the rail when the bar is depressed, substantially as set forth.

3. The combination with a mine trap-door; of an actuating-bar operatively connected to said door to open the same, said bar having one end arranged closer to a track-rail than its opposite end, a guide-bracket, a yoke sliding on said bracket and fixed to that end of the bar which is closer to the rail, thereby adapting said end of the bar to move laterally relative to the rail, a spring acting on the yoke to move the bar toward the rail, and a link supporting the opposite end of the bar and so arranged as to move that end of the bar laterally and downwardly toward the rail when the bar is depressed, substantially as and for the purpose set forth.

4. The combination with mine trap-doors, of actuating-bars arranged adjacent to one of the rails and on opposite sides of the door, a vertical shaft, two sets of cranks fixed to said shaft, one set being pivotally connected to said doors, rock-shafts operatively connected to said actuating-bars, weighted crank-levers fixed to said rock-shafts, and links, the inner ends of which are pivotally connected to the other set of cranks of the vertical shaft, and the outer ends of which have a slip-joint connection with the weighted crank-levers, substantially as set forth.

5. The combination of a self-closing mine trap-door; of an actuating-bar arranged adjacent to one of the rails of the track and operatively connected to said door for opening the same, a catch, a latch carried by said door and adapted to engage said catch and hold the door in open position, a second actuating-bar arranged in close relation to the track-rail, and releasing means operatively connected to said last-named actuating-bar for releasing said latch from its engagement after the car has passed through the door-opening, said latch and catch holding the door open against the tension of the self-closing means, whereby when the latch is released, the door is allowed to close automatically, substantially as and for the purpose specified.

6. A mine trap-door consisting of a door-frame and a horizontally-disposed plate, secured to the upper cross-piece thereof and provided with a vent-opening, in combination with doors arranged in divergent position and adapted to abut against the sides of said plate and capable of swinging in but one direction, and a downwardly-opening weighted valve for normally closing the opening in said plate and yielding under excessive pressure to permit of the escape of the confined gases within the mine, substantially as set forth.

7. A mine trap-door consisting of a door-frame, and a door capable of swinging in but one direction, combined with a gas-escape vent, a valve for closing said vent adapted to yield under excessive pressure to permit of the escape of confined gases within the mine, and means for normally holding said valve closed, substantially as set forth.

8. The combination with a self-closing mine trap-door; of an actuating-bar operatively connected to said door for opening the same, a catch, a latch carried by said door and adapted to engage said catch and hold the door in open position, a second actuating-bar, and releasing means operatively connected to said last-named actuating-bar, said releasing means comprising a rock-shaft, a weighted lever mounted upon said shaft, and a trip device carried by said lever to engage and release the latch when the actuating-bar is operated, said lever being adapted to return automatically to its normal position by gravity, substantially as specified.

9. The combination with a self-closing mine trap-door; of an actuating-bar, a shaft provided with cranks, one of which is connected to said door, a link connecting the actuating-bar with the other crank, a catch, a latch upon the door to engage said catch and hold the door open, a second actuating-bar, a rocking element operated by said bar, and a trip device set in action by said rocking element to engage the latch and release the same from said catch to permit the door to close, substantially as set forth.

In testimony whereof I have hereunto set my hand in the presence of two subscribing witnesses.

JOHN WACK.

Witnesses:
   CHAS. R. MILLER,
   CHAS. M. BALL.